Jan. 1, 1952      C. M. GOTTSCHAU      2,581,323
STAMP VENDING MACHINE
Filed Dec. 15, 1945      10 Sheets-Sheet 1
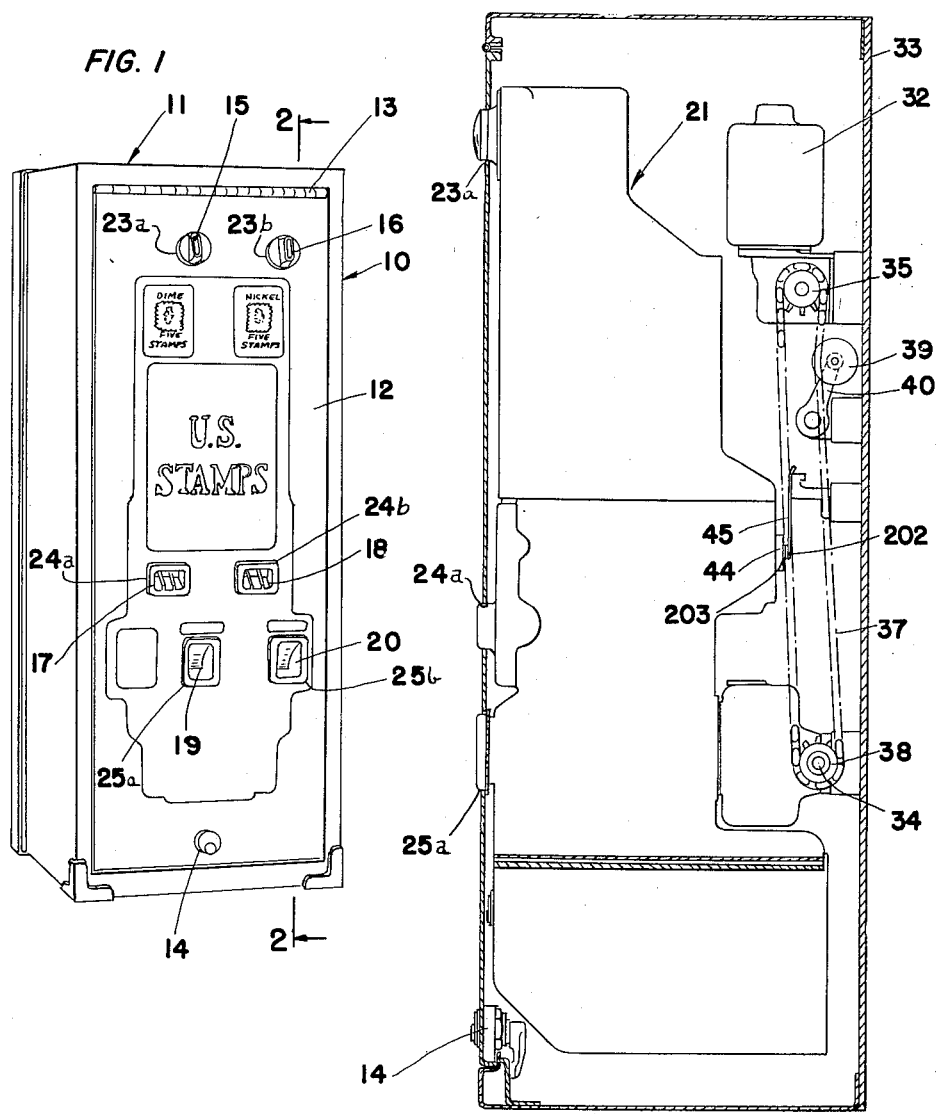
INVENTOR
CHRISTIAN M. GOTTSCHAU
BY
Blair, Curtis + Hayward
ATTORNEYS Jan. 1, 1952  C. M. GOTTSCHAU  2,581,323
STAMP VENDING MACHINE
Filed Dec. 15, 1945  10 Sheets-Sheet 2

INVENTOR
CHRISTIAN M. GOTTSCHAU
BY
Blair, Curtis, & Hayward
ATTORNEYS

Jan. 1, 1952  C. M. GOTTSCHAU  2,581,323
STAMP VENDING MACHINE
Filed Dec. 15, 1945  10 Sheets-Sheet 7

INVENTOR
CHRISTIAN M. GOTTSCHAU
BY
Blair, Curtis & Hayward
ATTORNEYS

Jan. 1, 1952     C. M. GOTTSCHAU     2,581,323
STAMP VENDING MACHINE
Filed Dec. 15, 1945     10 Sheets-Sheet 8
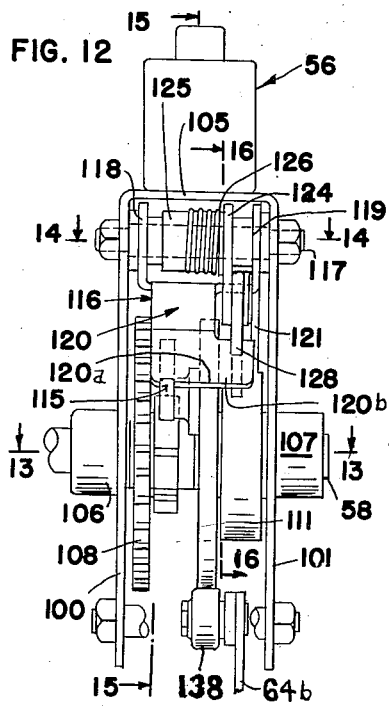
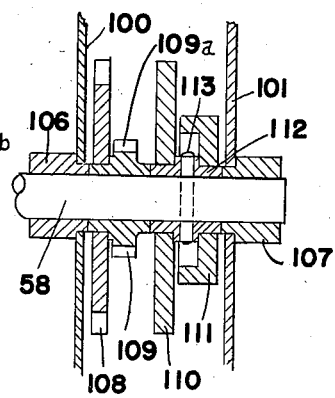
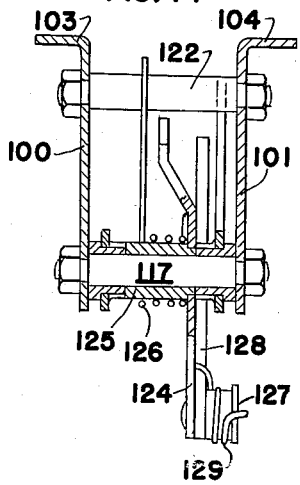
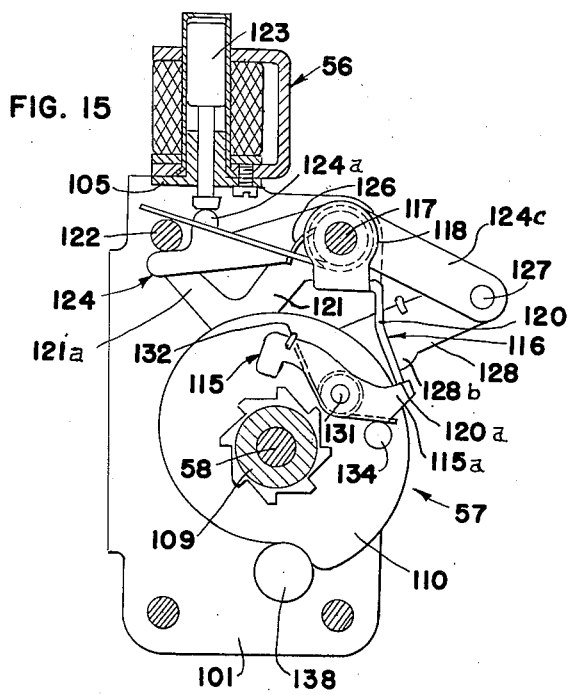
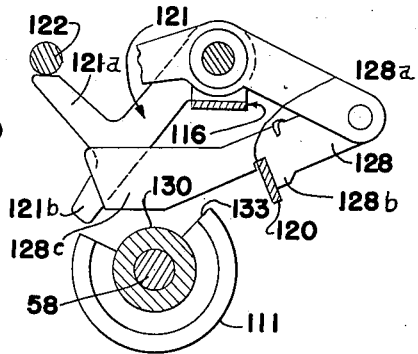
INVENTOR
CHRISTIAN M. GOTTSCHAU
BY
Blair Curtis + Hayward
ATTORNEYS Jan. 1, 1952   C. M. GOTTSCHAU   2,581,323
STAMP VENDING MACHINE
Filed Dec. 15, 1945   10 Sheets-Sheet 9
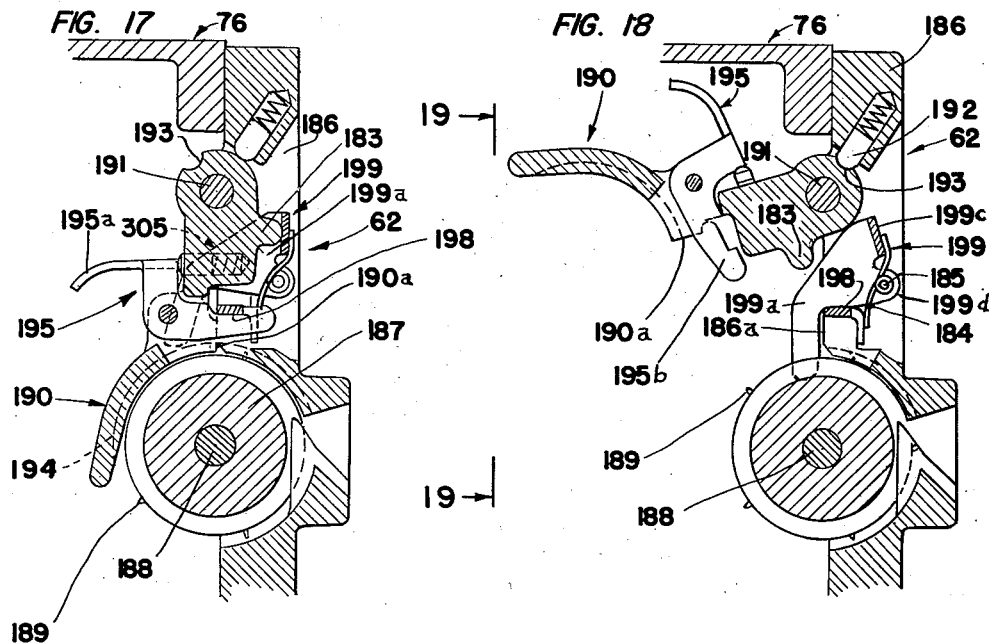
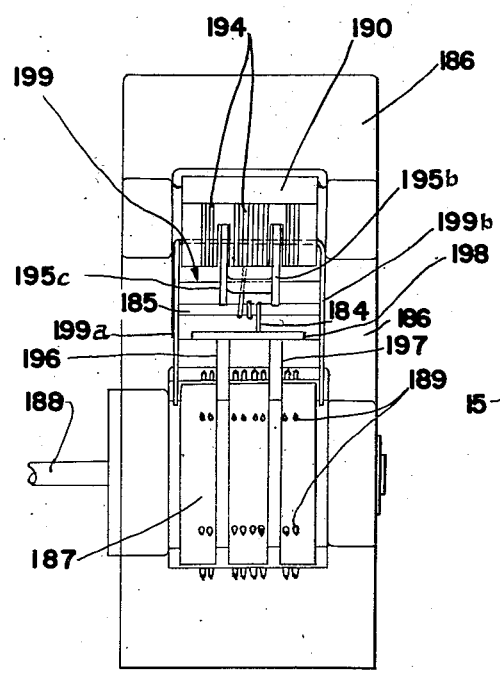
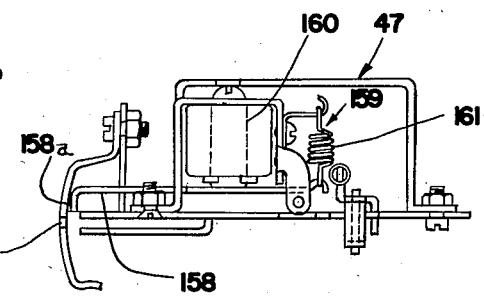
INVENTOR
CHRISTIAN M. GOTTSCHAU
BY
Blair, Curtis + Hayward
ATTORNEYS Jan. 1, 1952  C. M. GOTTSCHAU  2,581,323
STAMP VENDING MACHINE
Filed Dec. 15, 1945  10 Sheets-Sheet 10

INVENTOR
CHRISTIAN M. GOTTSCHAU
BY
Blair, Curtis + Hayward
ATTORNEYS

Patented Jan. 1, 1952

2,581,323

UNITED STATES PATENT OFFICE 2,581,323

STAMP VENDING MACHINE

Christian M. Gottschau, Rochester, N. Y., assignor to Commercial Controls Corporation, a corporation of Delaware Application December 15, 1945, Serial No. 635,342

14 Claims. (Cl. 194—7)

This invention relates to a stamp vending machine.

One of the objects of this invention is to provide a stamp vending machine which is simple, practical, and thoroughly durable. Another object is to provide a new and improved machine of the above character. Another object is to provide a machine of the above character which is entirely automatic in operation. Another object is to provide a machine of the above character in which the structural elements are so disposed as to attain a high degree of strength without heavy construction. Another object is to provide a machine of the above character which is compact and occupies a minimum of space. Still another object is to provide a machine of the above character which is accurate and efficient in operation. A further object is to provide a machine of the above character by the use of which a maximum of vending transactions may be made in a minimum of time. A still further object is to provide a machine of the above character in which adequate safeguards are provided to prevent the issuance of stamps in excess of the amount purchased by the customer in case the mechanism of the machine breaks down through misuse or for other reasons. Other objects will be in part obvious and in part pointed out hereinafter.

The invention accordingly consists in the features of construction, combinations of elements, and arrangements of parts, all as will be illustratively described herein, and the scope of the application of which will be indicated in the following claims.

Referring now to the accompanying drawings in which is shown one of the various possible embodiments of this invention, Figure 1 is a perspective view of the vending machine;

Figure 2 is a vertical section taken on the line 2—2 of Figure 1;

Figure 12 is a rear view of the clutch mechanism shown in Figure 7 taken from the direction of line 12—12 of Figure 7;

Figure 13 is a horizontal section taken on the line 13—13 of Figure 12;

Figure 14 is a horizontal section taken on the line 14—14 of Figure 12;

Figure 15 is a vertical staggered section taken on the line 15—15 of Figure 12;

Figure 16 is a vertical section taken on the line 16—16 of Figure 12;

Figure 17 is a vertical section on an enlarged scale taken through the stamp feeding mechanism taken on the line 17—17 of Figure 3;

Figure 18 is a view similar to Figure 17 with certain parts in different relative positions.

Figure 19 is an elevation of the stamp feeding mechanism shown in Figure 18 taken from the direction of line 19—19 in Figure 18.

Figure 20 is a horizontal section taken on the line 20—20 of Figure 6; and,

Similar reference characters refer to similar parts throughout the several views of the drawings.

Figure 3:
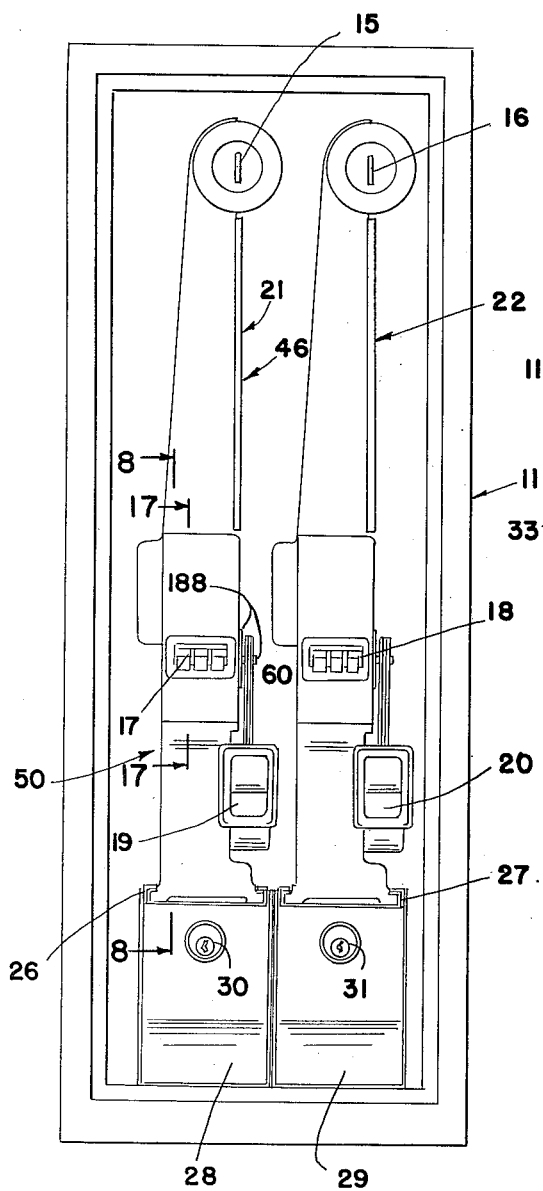
Figure 3 is a front elevation of the vending machine shown in Figure 1 having the door removed.

Referring to Figure 1, the vending machine, generally indicated at 10, includes a housing 11 having a door 12 mounted thereon by hinge 13. Door 12 opens upwardly to provide access to the inside of housing 11, and a lock, generally indicated at 14 (Figures 1 and 2) is provided to lock door 12. For the user of the machine there are two coin slots 15 and 16 for receiving coins for the purchase of postage. One of these slots 15 in the present machine is provided to receive dimes for which five 2-cent stamps are automatically delivered through vending opening 17. The other coin-receiving slot 16 is for receiving a nickel for which the purchaser receives five 1-cent stamps delivered through vending opening 18. Below openings 17 and 18, openings 19 and 20 are provided by which coins are returned if when being tested in the machine they prove to be spurious.

Within this machine two units, generally indicated at 21 and 22 (Figure 3), are provided for vending 2-cent and 1-cent stamps. The members on these machines having coin slots 15 and 16, vending openings 17 and 18, and coin return openings 19 and 20 therein extend through holes 23a, 23b, 24a, 24b, 25a, and 25b in door 12 (Figures 1 and 2). The vending units 21 and 22 (Figure 3) are so constructed that they are entirely automatic so that after the user drops a coin in either of the coin slots 15 and 16, stamps are automatically delivered through openings 17 and 18 if the coins are not spurious. If the coins are spurious, they are automatically returned through coin return openings 19 and 20.

Vending units 21 and 22 (Figure 3) are detachably mounted upon telescoping tracks 26 and 27 above coin boxes 28 and 29 which are provided with locks 30 and 31. Tracks 26 and 27 permit either of the units to be pulled partially out of housing 11 for reloading stamps, inspection purposes, and for taking meter readings, and if desired, a locking connection (not shown) between either of tracks 26 and 27 and each unit may be operated to permit the removal of either unit from its track and thus the housing. The motive power for both units is provided by a motor 32 (Figure 4) mounted on the rear wall 33 of housing 11. Motor 32 through reduction gearing contained in housing 36 drives a sprocket gear 35. Sprocket gear 35 through link chain 37 (Figures 2 and 4) drives shaft 34 through a sprocket gear 38. A roller 39 is rotatably mounted on an arm 40 which in turn is pivotally mounted on the rear wall 33 of housing 11 by a bracket 41 and roller 39 is resiliently urged against chain 37 by a spring (not shown) to insure the maintenance of driving relationship between the sprocket chain and the sprocket gears. Shaft 34 has a pair of gears 42 and 43 mounted thereon which drive units 21 and 22 (Figure 3) respectively.

Portions of the electrical circuit of each unit are mounted upon the rear wall 33 of housing 11 including a pair of relays 200 and 201. Each unit has a plate similar to plate 44 (Figure 2) mounted on the rear of the casting forming its framework, and these plates have contact points 203 thereon which engage contact points 202 mounted on resilient members 45 mounted on the rear wall 33 of housing 11. When a unit is slid in on its telescoping track into the housing, the contact points on the plates mounted on each unit contact the contact points 202 on the resilient members mounted on the rear wall, thus establishing electrical connection with the portion of the electrical circuit mounted on housing 11.

Figure 4:
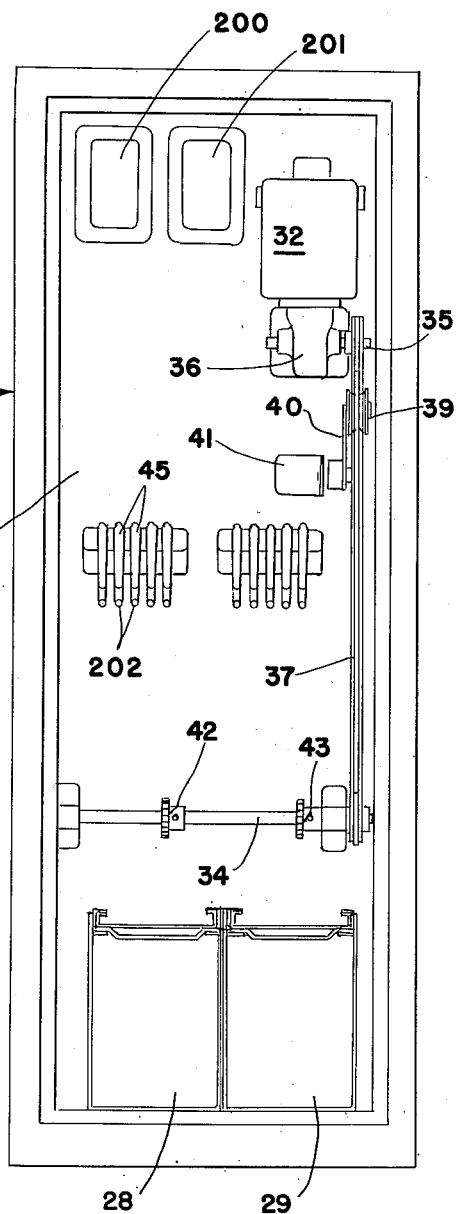
Figure 4 is a view similar to Figure 3 from which the two stamp vending units have been removed.
Figure 5:
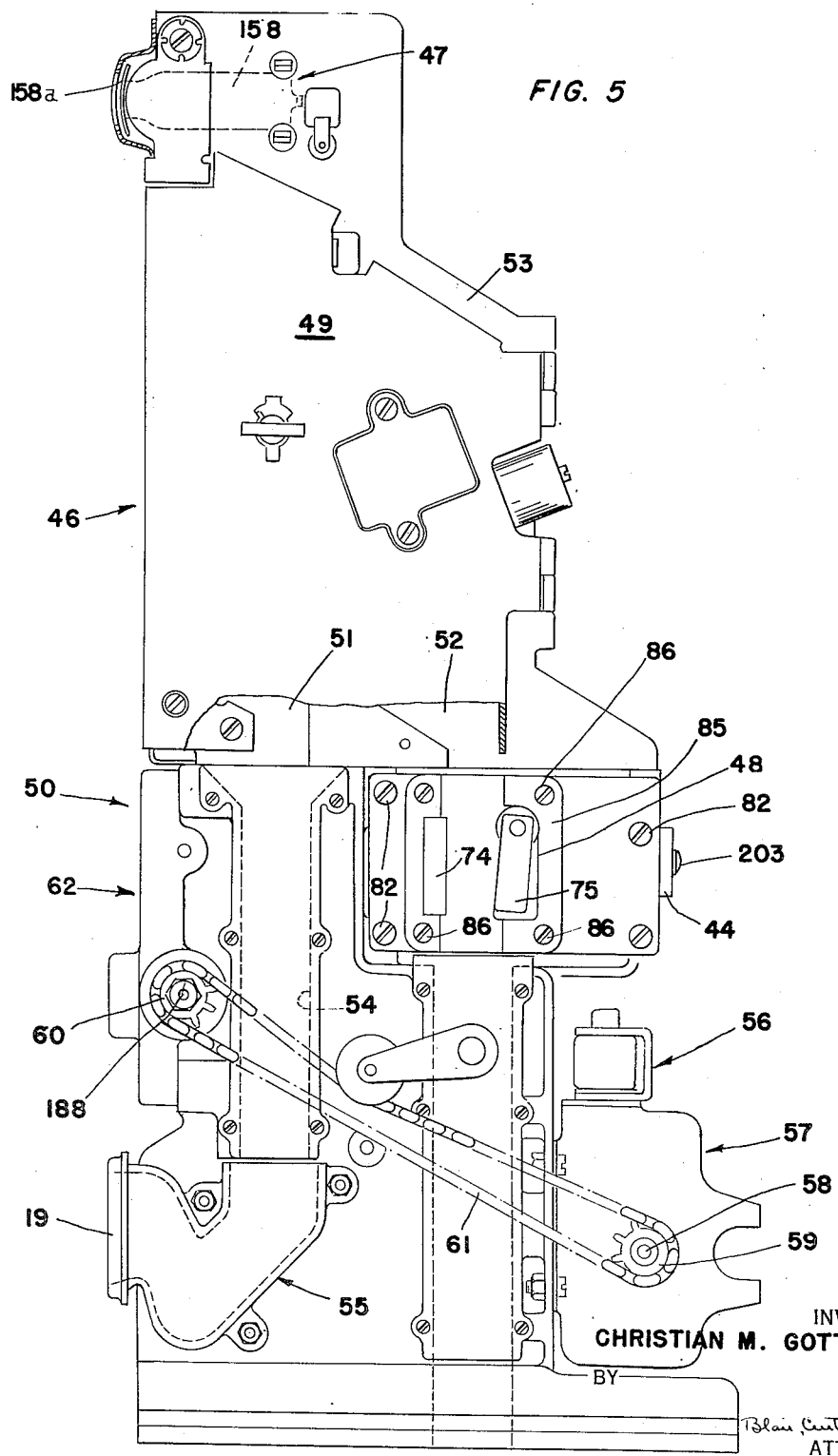
Figure 5 is a side elevation of one of the vending units shown in Figure 3 partly in section and taken from the right-hand side of one of the units as viewed in Figure 3.
Figure 6:
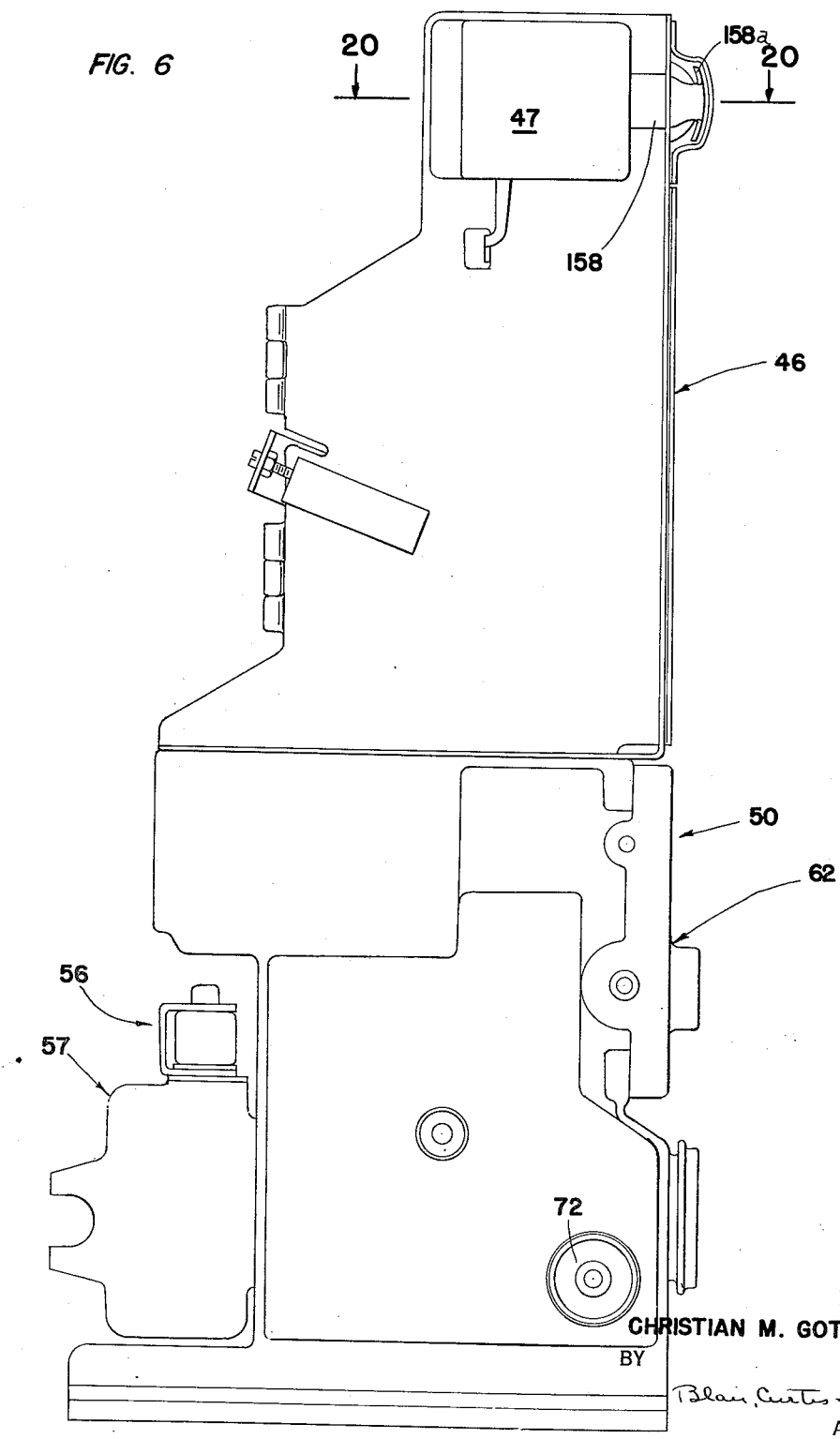
Figure 6 is a side elevation of one of the vending units shown in Figure 3 showing the opposite side of the vending unit from that shown in Figure 5.

As units 21 and 22 (Figure 3) are similar in construction, detailed description of the construction and operation of the units will be limited to unit 21. Unit 21 includes coin testing mechanism, generally indicated at 46 (Figures 3 and 5). Any suitable and practical coin testing mechanism may be used, the particular coin testing mechanism shown in this application being shown and described in my copending application for "Coin Testing Mechanism" filed December 15, 1945, and bearing Serial No. 635,341, now abandoned. Coin testing mechanism 46 includes a relay operated shutter, generally indicated at 47 (Figure 21), the operation of which is controlled by the coin switch, generally indicated at 48, which forms a part of the stamp vending mechanism, generally indicated at 50, all as will be described more fully hereinafter. Coin testing mechanism 46 has two chutes 51 and 52 (Figure 5) through which coins leave the coin testing mechanism. Coins passing downwardly through chute 51 are reject coins or spurious ones, and coins passing downwardly through chute 52 are genuine ones. As coin testing mechanism 46 includes two parallel flat plates 49 and 53 which are spaced from each other a distance slightly greater than the width of the coin being tested, coins passing out of the coin testing mechanism 46 through chutes 51 and 52 are on edge when they drop into the stamp vending mechanism 50. Reject coins drop downwardly through the stamp vending mechanism in a chute 54 (Figures 5 and 7) into a coin return box, generally indicated at 55, from which the user may obtain his coin through opening 19 (Figure 1).

In general, when a genuine coin drops from chute 52 into switch 48, an electrical connection is established so that motor 32 (Figure 4) is placed in operation. At the same time a solenoid, generally indicated at 56, is actuated to trip the clutch mechanism, generally indicated at 57. Clutch mechanism 57, which is of the single revolution type, drives shaft 58 (Figure 5), which, acting through sprocket gears 59 and 60 and link chain 61, drives the stamp feeding mechanism, generally indicated at 62, to feed stamps through opening 17 (Figure 1). At the same time, clutch mechanism 57 acts through cam 110 (Figure 8), the bellcrank, generally indicated at 64, link 65, and arm 66 to release the coin in coin switch 48 (Figure 5) and to close a switch, generally indicated at 67 (Figure 8) to maintain the electrical circuit to motor 32 during a cyclical operation.

A coil of stamps 69 is mounted on a reel 70 which in turn is rotatably mounted on wall 71 of the casting forming the framework of the vending unit. The stamp strip from coil 69 passes downwardly under a roll 72, also rotatably mounted on wall 71, and thence upwardly into the stamp feeding mechanism 62. To prevent the operation of the unit after the coil of stamps has been exhausted, feeler mechanism, generally indicated at 73, is provided which controls the operation of switch 68 so that when the stamps are exhausted, the circuit to coin shutter 47 (Figure 5) is broken, thus causing it to move to a closed position preventing users from inserting any more coins in the unit.

Figure 8:
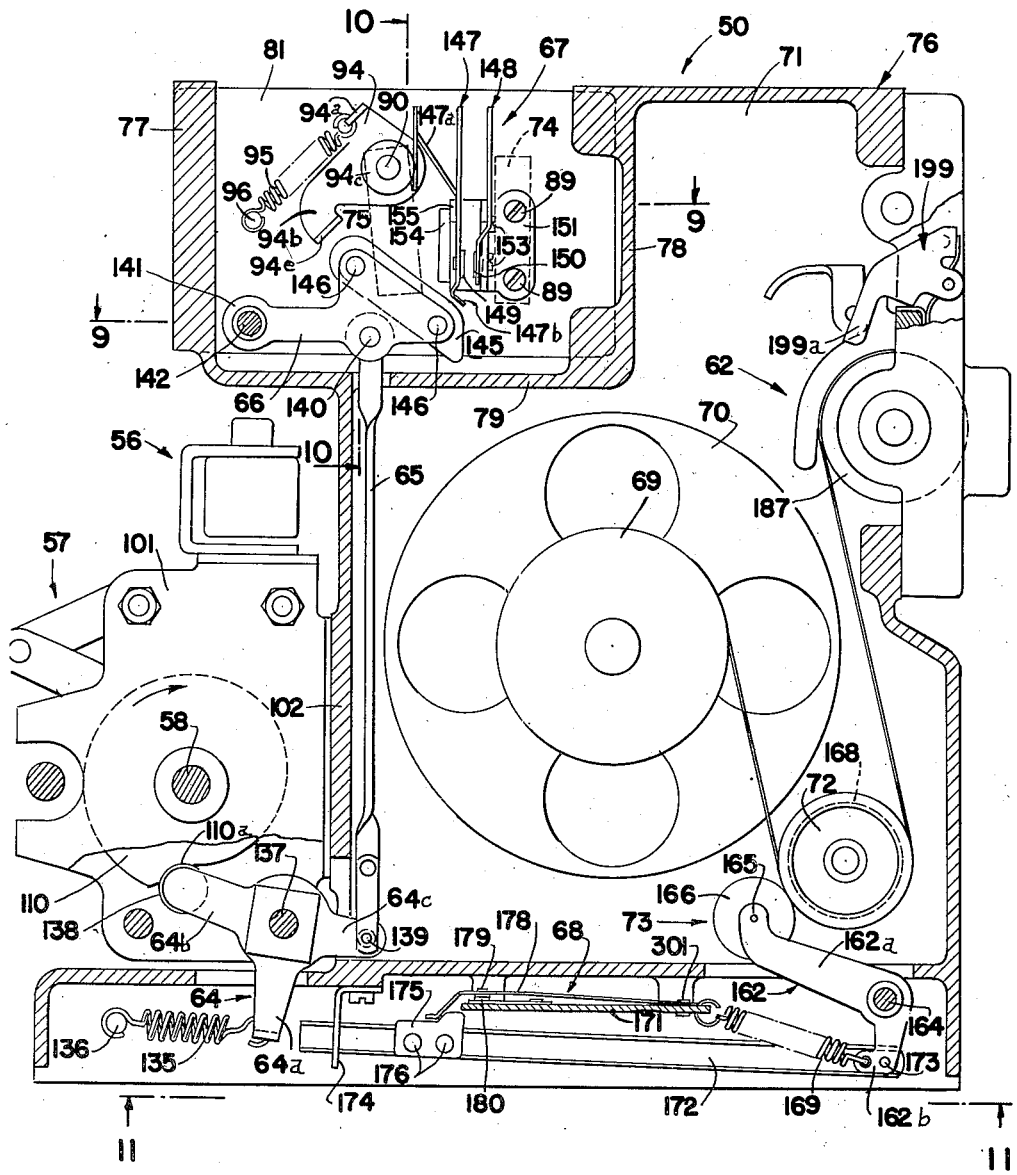
Figure 8 is a vertical section on an enlarged scale taken on the line 8—8 of Figure 3.
Figure 9:
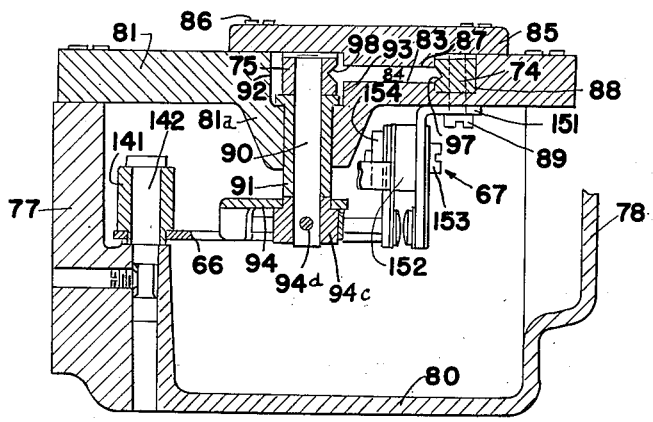
Figure 9 is a horizontal staggered section on a slightly enlarged scale taken on the line 9—9 of Figure 8.

Coin switch 48 (Figure 5) which controls the operation of vending mechanism 50 is mounted in a pocket in the casting, generally indicated at 76 (Figure 8), which forms the framework of the stamp vending mechanism. This pocket includes end walls 77 and 78, a bottom 79, and a side wall 80 (Figure 9). The coin switch includes a pair of metal contact members 74 and 75 (Figures 5, 7, and 9) which are mounted on a block 81 made of an insulating material such as Bakelite. Block 81 forms the other side wall of the pocket, is of rectangular shape, and is secured to end walls 77 and 78 (Figures 7 and 9) of the pocket by screws 82. The outside face of block 81 is recessed at 83 to provide a track 84 through which coins pass into and out of the coin switch. A block 85 (Figures 5 and 9) of clear plastic material is secured to the outer face of block 81 by screws 86 and the inside face 87 of an inwardly extending portion of block 85 forms the outside wall of track 84.

Figure 7:
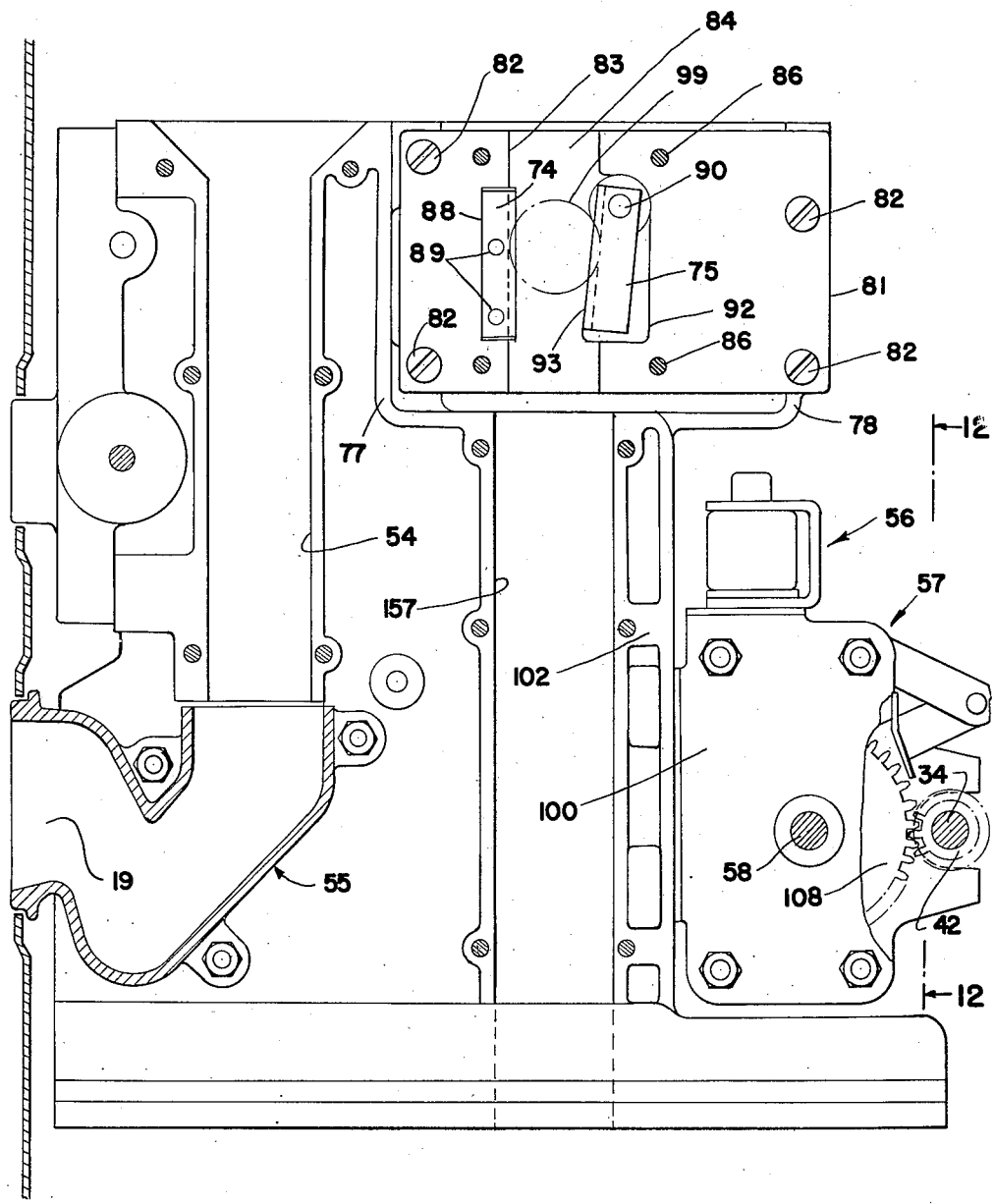
Figure 7 is a view on an enlarged scale of the lower portion of Figure 5, certain parts being removed and others broken away to more clearly show the mechanism.

Contact member 74 is mounted in a portion 88 of recess 83 in a vertical position and is secured to block 81 by screws 89 (Figures 7 and 9). Contact member 75 is mounted on and connected to a shaft 90 which in turn is pivotally mounted within a bearing 91. Bearing 91 is mounted in a bore extending through an inwardly extending hub portion 81a of block 81. Thus contact member 75 is free to pivot with respect to block 81. Movement of contact member 75 to the left and right, as viewed in Figure 7, is limited by side walls 92 and 93 (Figures 7 and 9) of the recess within which the contact member is mounted. A lever 94 (Figures 8 and 9) has a metal hub 94c through which shaft 90 passes. Hub 94c is pinned to shaft 90 by pin 94d. Lever 94 is biased in a counterclockwise direction, as viewed in Figure 8, by a spring 95 which is connected to a lug 94a formed on lever 94 and to a pin 96 mounted on the inner face of block 81. Thus spring 95 acting through lever 94, hub 94c, pin 94d (Figure 9), and shaft 90, resiliently holds the lower end of contact member 75 in contact with the left-hand side wall 93 (Figure 7) of the recess within which the contact member 75 is positioned.

Referring to Figure 7, it will be noted that contact member 74 is vertically positioned along one edge of track 84 and that contact member 75 when in contact with side wall 93 is at an angle to contact member 74. This makes the width of the track 84 diminish in a direction toward the bottom of the contact members. The contact members 74 and 75 when positioned as shown in Figure 7 are in the position they occupy when a coin enters track 84, and they are spaced a sufficient distance apart so that the coin is stopped by the contact members in the position indicated by the broken circle 99. The opposed edges of contact members 74 and 75 (Figures 7 and 9) have V-shaped grooves 97 and 98 therein which form a portion of the side walls of track 84. Thus a coin when its edges engage contact members 74 and 75 contacts each member at at least two points through its edges. Because of the fact that the coin is falling free as it passes down track 84 toward the contact members and because contact member 75 (Figure 7) is resiliently urged toward the left, the contact members are slightly spread on the impact of the coin, thus forcing the edges of the coin into excellent contact with each V-shaped groove.

When a coin establishes contact between metallic contact members 74 and 75, motor 32 starts and solenoid 56 is energized. This solenoid when energized trips the clutch mechanism 57 (Figure 8) to feed stamps from stamp vending opening 17 (Figure 1) as described above. The mechanism of clutch 57 which is of the single revolution type is mounted between two parallel plates 100 and 101 (Figures 7, 8, and 12). These plates are connected to the rear wall 102 (Figure 8) of casting 76 through flanges 103 and 104 (Figure 14) formed on side walls 100 and 101. Plates 100 and 101 are connected by an integral top portion 105 (Figures 12 and 15). Drive shaft 53 (Figures 12 and 13) is rotatably mounted on side plates 100 and 101 by a pair of bearing members 106 and 107. Intermediate walls 100 and 101 (Figure 13) a gear 108, a ratchet wheel 109, cam 110, and a trip cam 111 are mounted on shaft 58. Gear 108 is mounted on and secured to the hub 109a of ratchet wheel 109 which is rotatably mounted on shaft 58. Cam 110 and trip cam 111 are mounted on and secured to a bushing 112 pinned to shaft 58 by taper pin 113. When unit 21 is mounted in housing 11 (Figures 3 and 7) gear 108 meshes with gear 42 mounted on shaft 34, and thus gear 108 is directly driven by motor 32.

During each cyclical operation a driving connection is established between ratchet wheel 109 and cam 110 by a pawl 115 (Figures 13 and 15). This pawl when the mechanism is in rest position is held out of engagement with ratchet wheel 109 by an interponent, generally indicated at 116. Interponent 116 is mounted on shaft 117 by a pair of ears 118 and 119 (Figures 12 and 15). Interponent 116 includes a downwardly extending arm 120 which is mounted on the portion of interponent 116 connecting ears 118 and 199 and which when the machine is in rest position is positioned so that its lower edge 120a engages the rear end 115a of pawl 115. Interponent 116 has another arm 121 (Figure 16) extending forwardly in the machine and having two separate leg portions 121a and 121b. Movement of the interponent in a clockwise direction, as viewed in Figure 16, is limited by the engagement of the upper end of leg 121a with a spacing rod 122 (Figures 14 and 16) extending between and secured to plates 100 and 101.

When solenoid 56 (Figure 15) is actuated because of the presence of a coin in coin switch 48, the armature 123 of solenoid 56 moves downwardly and acts upon an upwardly extending portion 124a of a lever 124 to move the lever in a counterclockwise direction. Lever 124 is pivotally mounted on shaft 117 by its hub 125 (Figure 12) and is biased in a clockwise direction, as viewed in Figure 15, by a coil spring 126 mounted on its hub 125. Arm 124c of lever 124 is pivotally connected by a pivot pin 127 to a latch 128 extending forwardly in the machine. Latch 128 is biased in a downward direction with respect to arm 124c by a spring 129 mounted on pivot pin 127 (Figure 14). Latch 128 has a notch 128a (Figure 16) formed in its lower edge which is slightly wider than the thickness of interponent arm 120 and engages a portion 120b of arm 120 extending to the right of arm 120, as viewed in Figure 12. The width of latch 128 (Figure 16) increases immediately behind notch 128a to form a stop 128b. The forward end 128c of latch 128 is positioned above and actuated by trip cam 111. The lower leg 121b of arm 121 of interponent 116 is also positioned above and actuated by trip cam 111.

Referring to Figures 15 and 16, when armature 123 moves downwardly, it moves lever 124 in a counterclockwise direction drawing latch 128 rearwardly. As latch 128 is engaged through notch 128a with arm 120 of interponent 116 when lever 124 moves in a counterclockwise direction, interponent 116 is moved in the same direction. Movement of both latch 128 and the leg 121b of interponent 116 (Figure 16) in this direction is permitted because at this time they are positioned over a cut-out portion 130 in trip cam 111. When arm 120 of interponent 116 (Figure 15) is moved rearwardly, it is drawn off the rear end 115a of pawl 115, which is pivotally mounted on cam 110 by pivot pin 131. A spring 132 biases pawl 115 in a counterclockwise direction so that it engages ratchet wheel 109. As the driving motor 32 was energized at the same time as solenoid 56, gears 108 and ratchet wheel 109 (Figure 13) are being driven. Thus, when pawl 115 drops into engagement with ratchet wheel 109, a driving connection is established between gear 108 and cam 110. As cam 110 is connected to shaft 58 through bushing 112 and pin 113, shaft 58 is driven. As shaft 58 turns, it drives sprocket gear 59 (Figure 5) which drives feeding mechanism 62 through link chain 61 and sprocket gear 60.

When cam 110 turns, trip cam 111 (Figures 13 and 16) turns with it in a counterclockwise direction, as viewed in Figure 16. Edge 133 of recess 130 in cam 111 first strikes the under surface of latch 128 moving it upwardly so that notch 128a is disengaged from interponent arm 120 freeing the interponent. As the cam continues to turn, it next strikes leg 121b of the interponent and moves the interponent in a clockwise direction so that leg 121a is positioned against spacing rod 122. The interponent is locked in this position as at this time the lower end of leg 121b is riding on the outside surface of trip cam 111 and thus the pawl engaging edge 120a of arm 120 is locked during each cyclical operation in pawl engaging position. When cam 111 completes a revolution, the lower edge 120a of interponent arm 120 strikes the rear end portion 115a of pawl 115 disengaging the pawl from ratchet wheel 109. This breaks the driving connection between gear 108 and shaft 58 (Figure 13) and locks cam 110 against further rotation. When solenoid 56 is deenergized, lever 124 is moved in a clockwise direction by spring 126, as viewed in Figure 15, until stop portion 128b (Figure 16) thereof strikes the rear surface of arm 120 and then latch 128 drops downwardly as arm 120 enters notch 128a. At this time the machine is conditioned for its next operation.

If the solenoid is held down either through a breakdown or through misuse of the machine, the machine will not dispense more than the amount of stamps purchased. By referring to Figures 15 and 16, it will be seen that lever 124 is held in a tripped position as long as solenoid 56 is energized whereas the interponent is mechanically moved back to pawl-engaging position. Latch 128 could not move interponent 116 to a tripped position again as the connection between latch 128 and arm 120 (Figure 16) is not reestablished until latch 128 moves forwardly as lever 124 returns to its "rest" position. Thus, in effect, solenoid 56 could be energized continually without causing the clutch to be tripped more than once because an actuating connection could not be established between latch 128 and arm 120 unless armature 123 returns to its "rest" position.

It will be noted that a pin 134 is positioned beneath the rear end portion 115a of pawl 115, (Figure 15). When the interponent 116 is in its "rest" position engaging portion 115a of pawl 115, it would not be possible to move cam 110 in a counterclockwise direction because clockwise pivoting of pawl 115 is limited by pin 134. To lock cam 110 against movement in a clockwise direction (Figure 15) when it is in a "rest" position and to operate other mechanism in the vending machine, three-armed bellcrank 64 (Figure 8) is provided. Arm 64a of bellcrank 64 is connected by a spring 135 to a pin 136 mounted on the casting 76 forming the framework of the vending mechanism. Spring 135 resiliently urges movement of three-armed bellcrank 64, which is pivotally mounted on shaft 137, in a clockwise direction. Arm 64b of bellcrank 64 has a cam roller 138 mounted on its rear end which engages the periphery of cam 110. Cam 110 has a detent 110a thereon into which roller 138 drops at the end of each cyclical operation. The coaction of roller 138 and cam detent 110a prevents movement of cam 110 in a counterclockwise direction, as viewed in Figure 8, and thus referring to Figure 15, at the end of each cyclical operation, cam 110 is locked against movement in either a counterclockwise or clockwise direction.

It will be noted that the radius of cam 110 gradually increases from detent 110a as the edge of cam 110 is followed in a counterclockwise direction, as viewed in Figure 8. Thus as cam 110 rotates in a clockwise direction after a driving connection has been established between gear 108 and cam 110 through pawl 115 (Figures 13 and 15), bellcrank 64 is turned in a counterclockwise direction, as viewed in Figure 8. Another arm 64c of bellcrank 64 is connected by a pivot pin 139 to a link 65 extending upwardly to arm 66. Link 65 is pivotally connected to arm 66 by pivot pin 140. Arm 66 is pivotally mounted by its hub 141 (Figure 9) on a stud shaft 142 which is mounted on the framework of the vending mechanism. Arm 66 (Figure 8) has a cam plate 145 made of an insulating material secured thereto by rivets 146. The upper edge of this plate slants downwardly in the machine and has a dual function in that when it moves upwardly its acts on a flange portion 94e of arm 94b of lever 94 to move lever 94 in a clockwise direction while it also closes switch 67.

Figure 10:
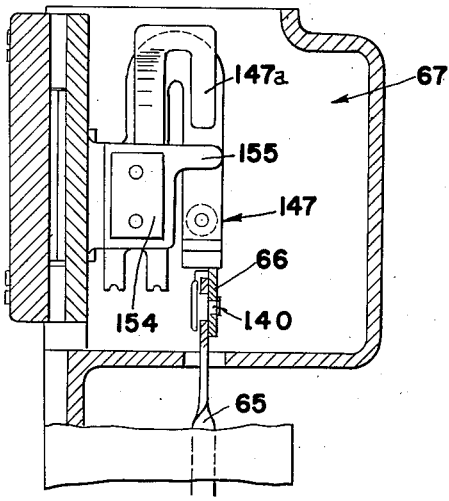
Figure 10 is a vertical staggered section on a slightly enlarged scale taken on the line 10—10 of Figure 8.

Switch 67 (Figures 8, 9, and 10) includes a pair of members 147 and 148 made of resilient metal which are mounted by a bracket 151 on plate 81 (Figure 9), and are separated from each other by a piece of insulating material 152. A pair of screws 153 are provided to hold the switch in assembled relationship and these screws thread into a metal block 154 (Figures 8 and 10) which is insulated from member 147 by a piece of insulating material 155. Member 147 has an arm 147a which extends rearwardly therefrom and which contacts the metal hub 94c (Figure 9) to which coin switch contact member 75 is connected through shaft 90. Switch member 148 is connected to member 74 by screws 89 and thus switch members 147 and 148 are in parallel with contact members 74 and 75. Therefore, when closed they shunt members 74 and 75 to maintain the motor-solenoid circuit after the coin is dropped.

When the cam plate 145 (Figure 8) moves upwardly during a cyclical operation of the mechanism, it first strikes the lower end 147b of switch member 147. Plate 145 then cams the lower end 147b of member 147 to the right, as viewed in Figure 8, establishing contact between contact points 149 and 150. This connection shunts the electrical connection established by the coin between contact members 74 and 75. Next the upper end of cam plate 145 acts upon flange 94e of lever 94 to move contact member 75 in a clockwise direction, as viewed in Figure 8. This releases the coin held between contact members 74 and 75 permitting it to drop downwardly in the machine through chute 157 (Figure 7) into coin box 28 (Figure 3). It will be noted that arcing is prevented when the coin is released from its position between contact members 74 and 75 because electrical connection is established between members 147 and 148 by contact points 149 and 150 before the coin is released. Thus bellcrank 64 (Figure 8), in addition to locking cam 110 in its "rest" position, also when actuated by cam 110 releases the coin from the coin switch 48 and maintains the circuit of motor 32 closed throughout the cyclical operation of the clutch mechanism 57.

To prevent the insertion of a coin into coin slot 15 (Figure 1) after the supply of stamps in the stamp vending unit 21 has been exhausted, the shutter mechanism, generally indicated at 47 (Figures 5 and 20) is provided. The shutter 158 is the armature of a standard relay, generally indicated at 159 (Figure 20). Shutter 158 includes a flange portion 158a which is positioned behind slot 15 and is normally held to one side of the slot because the relay 159 is energized whenever the vending mechanism is in condition for operation. Whenever the machine is disconnected from the source of current or the current fails, then relay 159 is deenergized and spring 161 moves the shutter to a closed position.

Figure 11:
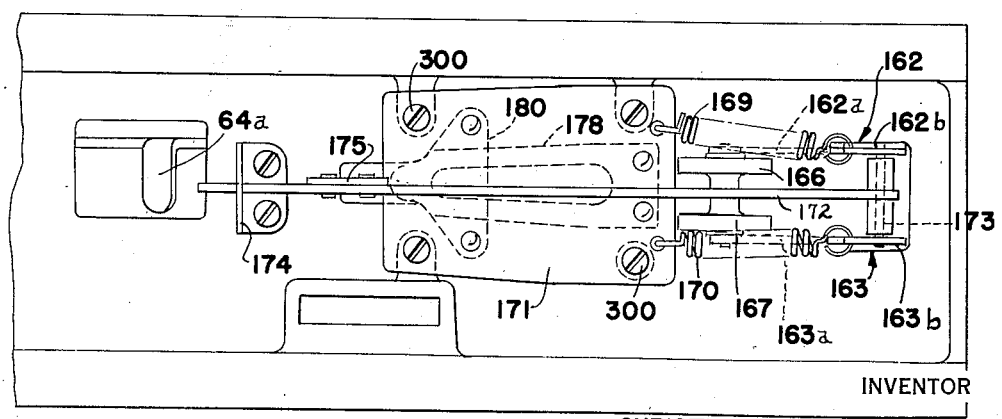
Figure 11 is a plan view of the bottom of one of the vending units taken from the direction of the line 11—11 on Figure 8.

The operation of this shutter is also controlled by the feeler mechanism, generally indicated at 73 (Figure 8) so that when the supply of stamps is exhausted, the circuit to relay 159 (Figure 20) is broken, thus permitting shutter 158 to close. The feeler mechanism includes a pair of levers, generally indicated at 162 and 163 (Figures 8 and 11), which are pivotally mounted on a shaft 164 extending transversely across and mounted on the framework of the vending mechanism. Between the upper ends of arms 162a and 163a of levers 162 and 163 is a shaft 165 having a pair of feeler discs 166 and 167 mounted thereon. Shaft 165 is rotatably mounted on the upper ends of arms 162a and 163a and the edges of discs 166 and 167 are aligned with grooves in roller 72, similar to groove 168, which are of greater width than the thickness of the discs. Discs 166 and 167 are prevented by the stamp strip from entering the grooves in roller 72 as long as stamps are positioned between the discs and the grooves in roller 72.

The levers 162 and 163 on which discs 166 and 167 are mounted are biased in a clockwise direction (Figure 8) by springs 169 and 170 (Figures 8 and 11) which are connected to the lower arms 162b and 163b of levers 162 and 163. These springs are also connected to a flat plate 171 made of insulating material (Figures 8 and 11) secured to bosses on framework 76 by screws 300. The lower arms 162b and 163b of levers 162 and 163 are pivotally connected to a link 172 by a pivot pin 173 (Figure 8). Link 172 extends rearwardly through a hole in a bracket 174 secured to framework 76 and its rear end is so positioned that whenever bellcrank 64 moves in a counterclockwise direction during a cyclical operation, it moves link 172 to the right, as viewed in Figure 8, thus moving the feeler discs 166 and 167 out of contact with the stamp strip to permit the strip to be freely drawn from reel 70 under roll 72. Whenever the supply of stamps is exhausted, at the end of a cycle, levers 162 and 163 move in a clockwise direction (Figure 8), and discs 166 and 167 enter the grooves in roller 72.

Switch 68 includes a contact plate 180 mounted on di-electric plate 171 and a contact point 179 mounted on a thin resilient member 178 connected at its forward end by a rivet 301 to plate 171. When discs 166 and 167 enter the grooves in roller 72, levers 162 and 163 acting through pivot pin 173 move link 172 to the left, as viewed in Figure 8. Link 172 has a di-electric member 175 mounted thereon by rivets 176 and this member cams the downwardly extending rear end of switch member 178 upwardly to separate contact plate 180 and contact point 179. As the circuit to the coin shutter mechanism 47 (Figure 5) is completed through this contact plate and contact point, whenever the contact point and contact plate are separated, the circuit to the relay in the coin shutter mechanism is broken, thus causing the coin shutter to close the coin intake opening 15 (Figure 1).

Referring to Figures 17, 18, and 19, in which the stamp feeding mechanism 62 is shown in detail, the mechanism is mounted on a casting 186 which in turn is mounted on the front of casting 76 which forms the framework of the stamp vending mechanism. The stamp roll 187 is mounted on shaft 188 to which it is keyed, and shaft 188 is rotatably mounted in bearings on casting 186. Shaft 188 is driven by a sprocket wheel 60 (Figures 3 and 5) secured to its righthand end, as viewed in Figure 3. The stamp roll has five sets of pins 189 thereon which are spaced the same distance apart as the spacings between the perforations in the strip of stamps which they feed. To hold the stamp strip in contact with pins 189, a stamp roll cover, generally indicated at 190, is provided. This cover is pivotally mounted by a pin 191 on casting 186 and when in a raised position, as shown in Figure 18, is held in that position by a spring pressed detent 192 which enters a notch 193 in the hub portion of cover 190. Stamp roll cover 190 has a plurality of grooves 194 (Figures 17 and 19) cut into the surface of the cover which is positioned adjacent to the stamp roll. The pins 189 on roll 187 pass through these grooves as the stamp roll rotates.

Stamp roll cover 190 is provided with a shoulder 190a which coacts with the rear face 186a of casting 186 to limit the downward movement of the stamp roll cover. To maintain stamp roll cover 190 in a closed position, a catch, generally indicated at 195, is provided. This catch includes a finger piece 195a and a pair of arms 195b and 195c (Figure 19) which pass through casting 186 in slots 196 and 197. Arms 195b and 195c are provided with catches which latch under a catch plate 198 mounted on casting 186 above slots 196 and 197, and a spring and plunger 305 (Figure 17) is provided to hold catch 195 in a latched position.

The longitudinal alignment of the perforations in a strip of stamps weaves from side to side on a roll of stamps. Thus, when a strip of stamps is mounted upon pins 189, the edges of the stamp strip may move to the left or right, as viewed in Figure 19, as they are fed by roll 187. Because this weaving of the stamp strip as it is fed by the stamp roll is considerable, ample space is provided on each side of the stamp roll to permit this weaving without having the strip bind. To insure that the stamp strip will be properly aligned on the stamp roll at the beginning so that space is left at each side of the strip for weaving, a bracket, generally indicated at 199, is provided.

Bracket 199 includes a pair of legs 199a and 199b connected by a center portion 199c. Each of the legs of bracket 199 has a lug similar to lug 199d (Figure 18) thereon by means of which the bracket is pivotally mounted on a pivot pin 185. The center portion 199c of bracket 199 is pressed rearwardly by a spring 184 which is mounted on pivot pin 185. When the stamp cover is raised, spring 184 moves bracket 199 to the position it occupies in Figure 18 at which time the lower ends of its legs 199a and 199b extend below the outside edges of stamp roll 187 (Figure 19). At this time a strip of stamps may be mounted upon the stamp roll 187 using the legs 199a and 199b as guides.

When stamp roll cover 190 is moved to a closed position, a boss 183 (Figure 17) formed thereon strikes the rear face of the center portion 199c of bracket 199 pivoting the bracket in a clockwise direction (Figure 18) to move the lower ends of legs 199a and 199b upwardly so that they are no longer positioned adjacent the edges of the stamp roll 187 (Figure 17). Accordingly, bracket 199 assists the operator loading stamps into the machine in properly aligning the stamp strip upon the stamp roll 187. When the stamp roll cover is closed by the operator, then the legs of bracket 199 are moved upwardly to a position where they do not interfere with weaving of the stamp strip as it is fed by the stamp roll, thus insuring proper feeding of the stamp strip in spite of incorrect alignment of the perforations therein.

Figure 21:
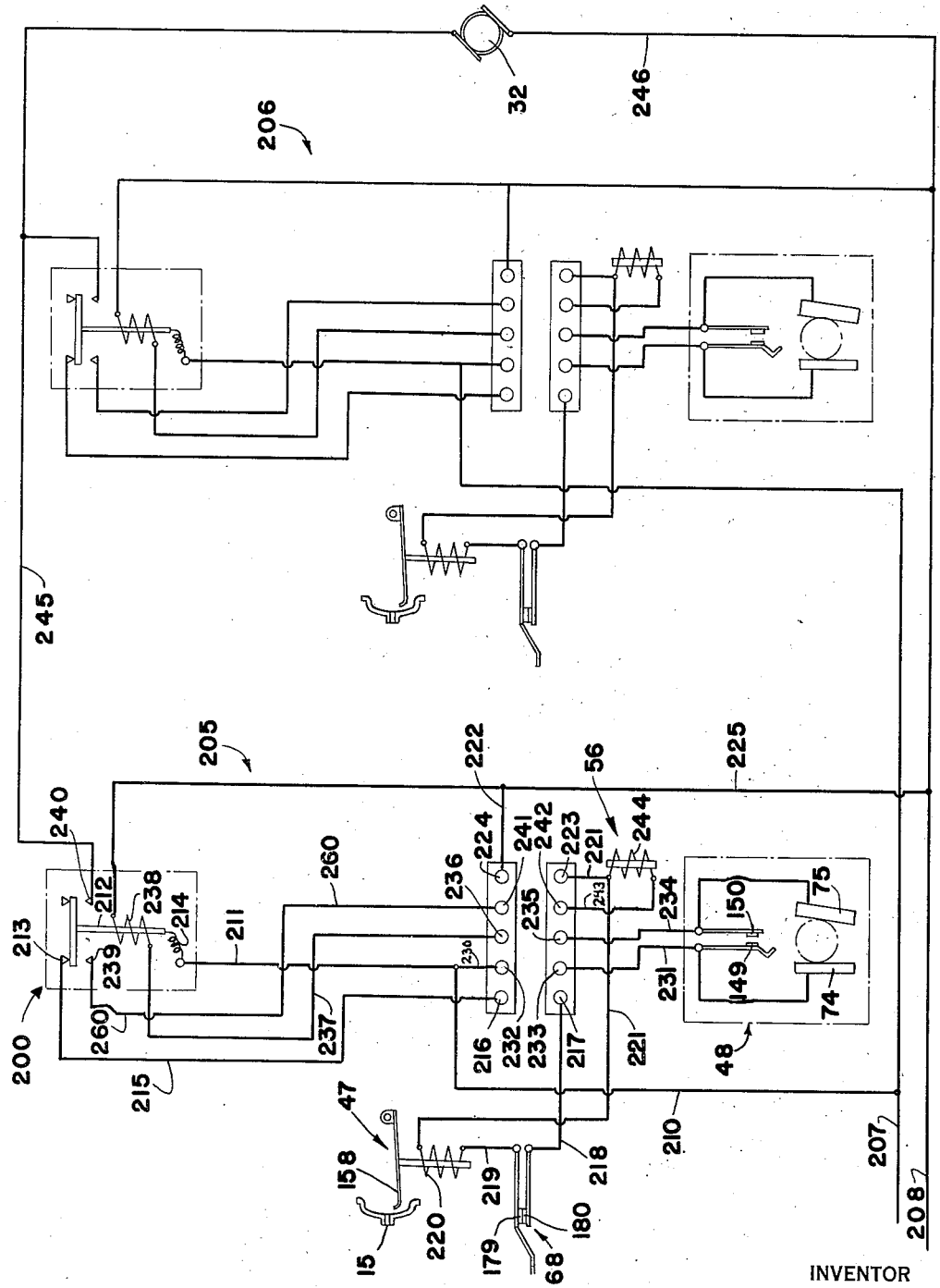
Figure 21 is a diagrammatic showing of the electrical circuit for the vending machine.

Referring now to Figure 21 in which the circuit of the vending machine is schematically shown, the circuit includes two subsidiary circuits, generally indicated at 205 and 206, for vending units 21 and 22 (Figure 3). As circuits 205 and 206 are similar, detailed description will be limited to circuit 205. Current is supplied to the circuits through power supply lines 207 and 208 which are connected to any suitable source of current. As stated hereinabove, the relay operated shutter mechanism, generally indicated at 47, is normally energized. The circuit to this relay comprises line 210 connected to power supply line 207 and to line 211. Line 211 is connected by a pigtail 214 to the armature 212 of relay 200 which is mounted on the rear wall of the vending machine housing 11. Armature 212 is normally held by a spring (not shown) against contact point 213, thus completing a circuit between lines 211 and 215. Line 215 is connected through contact points 216 and 217 to a line 218 which is connected to switch 68. Through the contact points 179 and 180 of switch 68 and line 219 the circuit to one side of the coil 220 of relay 47 is completed. A line 221 connected to the opposite end of coil 220 is connected to line 222 through contact points 223 and 224. Line 222 is connected to power supply line 208 through line 225.

Thus, whenever the machine is in a "rest" position, the coil 220 of relay 47 is energized and thus the armature 158, the end of which forms a shutter for closing intake opening 15, is held in a position so that it does not close the intake opening.

When a coin drops into coin switch 48, it completes a circuit between contact members 74 and 75 which acts through relay 200 to trip the clutch solenoid 56 to break the circuit to relay 47, and to start motor 32. The circuit to contact member 74 of coin switch 48 is through line 231, contact points 232 and 233, line 230, and line 210. Contact member 75 is connected to power supply line 208 through line 234, contact points 235 and 236, line 237, the coil 238 of relay 200, and line 225. Thus, whenever a coin completes the circuit between contact members 74 and 75, coil 238 of relay 200 is energized and armature 212 of relay 200 moves downwardly, as viewed in Figure 21, to bridge the contact points 239 and 240.

When armature 212 moves downwardly, the circuit to relay 47 is broken, preventing coins from being inserted into this unit of the vending machine until the vending transaction is completed. When the circuit between contact points 239 and 240 is made by armature 212, the circuit to solenoid 56 which trips the single revolution clutch is completed, as is the circuit to motor 32. The circuit to one side of coil 244 of solenoid 56 is completed through line 210, line 211, pigtail 214, armature 212, contact point 239, line 260, contact points 241 and 242, and line 243. The opposite side of coil 244 is connected to power supply line 208 through line 221, contact points 223 and 224, line 222, and line 225. The circuit to one side of motor 32 is completed from line 207 through lines 210 and 211, pigtail 214, armature 212, contact point 240, and line 245 and the opposite side of motor 32 is connected to power supply line 208 by line 246.

Thus when a coin completes the circuit between contact members 74 and 75, the coin intake opening is closed, solenoid 56 is energized to trip the single revolution clutch, and motor 32 is placed in operation. As described hereinabove, during the cyclical operation of the single revolution clutch, arm 66 (Figure 8) moves upwardly to close contact points 149 and 150 and to move contact member 75 to release the coin positioned between contact members 74 and 75. Engagement between contact members 149 and 150 (Figure 21) shunts the contact made by contact members 74 and 75 and as the contact between contact points 149 and 150 is maintained throughout the cyclical operation of the clutch, the circuit to solenoid 56 and motor 32 is maintained during the cyclical operation. At the end of a cyclical operation, contact between contact points 149 and 150 is broken when arm 66 (Figure 8) moves downwardly. This breaks the circuit to the coil 238 of relay 200 thus permitting the armature 212 to move back into contact with contact point 213. This completes the circuit again to the coil 220 of relay 47 moving the armature of this relay to a position where a coin may again be fed into the machine through intake opening 15 (Figure 1).

As pointed out hereinabove, when the supply of stamps is exhausted, mechanism in the machine operates to separate contact points 179 and 180. This breaks the circuit to the coil 220 of relay 47 thus closing intake opening 15 and preventing users from inserting coins into the vending unit in which the supply of stamps is exhausted.

In operation, whenever a coin drops down pay chute 52 (Figure 5) it engages members 74 and 75 to complete the circuit to motor 32 (Figure 2) and solenoid 56 (Figure 8). Motor 32 then drives gear 108 in clutch 57 (Figure 7) through sprocket gear 35 (Figure 2), link chain 37, sprocket gear 38, shaft 34 (Figure 4), and gear 42. When solenoid 56 (Figure 15) is energized, its armature presses downwardly upon lever 124 pivoting it in a counterclockwise direction. Member 124 acting through latch 128 draws the arm 120 of interponent 116 rearwardly. This permits spring 132 to move pawl 115 in a counterclockwise direction and engage ratchet wheel 109 which is connected to gear 108. Thus as gear 108 is driven, it drives cam 110 on which pawl 115 is mounted and as cam 110 is connected to shaft 58, sprocket gear 59 (Figure 5) is driven. Sprocket gear 59 acting through link chain 61 drives sprocket gear 60 a complete revolution. As there are five sets of pins on the stamp roll 187 (Figure 17) five stamps are fed through the stamp vending opening 17 (Figure 1).

As cam 110 makes a revolution in a clockwise direction, as viewed in Figure 8, it pivots bellcrank 64 in a counterclockwise direction. As bellcrank 64 moves in a counterclockwise direction, it acts through link 65 to raise arm 66. Arm 66 acting through plate 145 first closes switch 67 by camming contact point 149 into engagement with contact point 150 and then acting through lever 94 pivots contact member 75 in a clockwise direction (Figure 8) to release the coin in the coin switch so that it drops downwardly to the coin box 28 (Figure 3) through chute 157 (Figure 7).

As cam 110 rotates in a counterclockwise direction, as viewed in Figure 15, trip cam 111 (Figure 16) rotates with it. The edge 133 of recess 130 in trip cam 111 acts upon latch 128 to break the connection between this latch and interponent arm 120. Next edge 133 of trip cam 111 pivots interponent 116 in a clockwise direction, as viewed in Figure 16, so that the edge 120a of arm 120 is in a pawl engaging position. When the electrical circuit to solenoid 56 (Figure 15) is broken, then spring 118 moves lever 124 in a clockwise direction so that latch 128 reengages arm 120 of interponent 116. At the completion of a cyclical operation, interponent 116 engages pawl 115 (Figure 15) to disengage it from ratchet wheel 109. The unit at this time is conditioned for another vending transaction.

At the same time that the circuit is completed to solenoid 56 (Figure 15) and to motor 32 (Figure 2) the circuit to coin shutter 42 is interrupted to permit the coin shutter 158 (Figures 5 and 20) to close the coin intake opening 15. The circuit to the relay operated shutter 158 is also interrupted when the supply of stamps is exhausted. This is accomplished by the entrance of feeler discs 166 and 167 (Figure 11) into grooves in roller 72 (Figure 8). This permits levers 162 and 163 to move link 172 rearwardly and break the contact between contact point 179 and contact plate 180. As the circuit to the relay controlled shutter 158 (Figure 5) is completed through contact point 179 and contact plate 180 when these points are separated then shutter 158 moves to a closed position.

To permit the stamp strip to be easily fed by stamp roll 187 (Figure 8) discs 166 and 167 (Figures 8 and 11) are moved out of contact with the stamp strip passing under roller 72 during each cyclical operation. This is accomplished by the arm 64a of three-armed bellcrank 64 which acts upon the rear end of link 172 to pivot levers 162 and 163 in a counterclockwise direction, as viewed in Figure 8.

Stamps are fed through the stamp feeding mechanism 62 (Figure 17) by a stamp roll 187. This stamp roll is provided with a cover 190 which may be moved between closed and open positions, as shown in Figures 17 and 18. When the cover is open (Figure 18), then the legs on bracket 199 (Figure 18) are positioned adjacent the outer edge of the stamp roll to assist the operator mounting the stamp strip in properly aligning the stamp strip on pins 189. When the cover 190 is closed, it pivots bracket 199 in a clockwise direction, as viewed in Figure 18, to move the legs of bracket 199 upwardly to the position they occupy in Figure 8 to permit the stamp strip to be fed by the roll 187 without binding if the strip weaves back and forth sideways on the stamp roll due to longitudinal misalignment of the perforations therein.

Thus practical and efficient mechanism has been disclosed which is entirely automatic in operation. The mechanism is provided with a type of clutch which prevents the issuance of more than the number of stamps purchased in spite of breakdowns of the clutch mechanism caused by either misuse or faulty operation of the machine. Furthermore, the mechanism is compact and is constructed in a simple and practical manner which insures accurate operation of the mechanism over a long period of time under conditions of extended usage. Thus, it will be seen that the several objects hereinabove mentioned, as well as many others, have been successfully accomplished.

As many possible embodiments may be made of the above invention and as many changes might be made in the embodiment above set forth, it is to be understood that all matter hereinbefore set forth or shown in the accompanying drawings is to be interpreted as illustrative and not in a limiting sense.

What is claimed is:

1. In a coin controlled vending mechanism, in combination, a coin switch, a single revolution clutch, means for driving said clutch, means for feeding a strip of stamps, means operatively connecting said clutch and said stamp strip feeding means, interponent means for holding said clutch in a disengaged condition, means controlled by said coin switch for moving said interponent means out of a disengaging position, and a cam driven by said clutch for disengaging said interponent means from said switch controlled means after said interponent means has been moved to a tripped position and means for returning said interponent means to a clutch disengaging position.

2. In coin controlled vending mechanism, in combination, a coin switch, a single revolution clutch, means for driving said clutch, means for feeding a strip of stamps, means operatively connecting said clutch and said stamp strip feeding means, interponent means for holding said clutch in a disengaged condition, means controlled by said coin switch for moving said interponent means out of a disengaging position, and a cam driven by said clutch for disengaging said interponent means from said switch controlled means after said interponent means has been moved to a tripped position and for moving said interponent means back to clutch disengaging position.

3. In coin controlled vending mechanism, in combination, a coin switch, a single revolution clutch, means for feeding a strip of stamps, means operatively connecting said stamp strip feeding means and said clutch, a solenoid controlled by said coin switch, lever means controlled by said solenoid, clutch tripping means, means forming a detachable connection between said lever means and said clutch tripping means, said lever means when operated by said solenoid moving said clutch tripping means to permit engagement of the driving and driven portions of said clutch, means for breaking said connection between said lever means and said clutch tripping means after said clutch has been tripped, and means for returning said clutch tripping means to a position where it disengages said clutch at the end of a single revolution regardless of the position of said solenoid or said lever.

4. In coin controlled vending mechanism, in combination, a coin switch, a single revolution clutch, means for feeding a strip of stamps, means operatively connecting said stamp strip feeding means and said clutch, a solenoid controlled by said coin switch, lever means controlled by said solenoid, clutch tripping means, means forming a detachable connection between said lever means and said clutch tripping means, said lever means when operated by said solenoid moving said clutch tripping means to permit engagement of the driving and driven portions of said clutch, means for breaking said connection between said lever means and said clutch tripping means after said clutch has been tripped, means for returning said clutch tripping means to a position where it disengages said clutch at the end of a single revolution regardless of the position of said solenoid or said lever, and means for returning said lever to a position where it reengages said clutch tripping means when said solenoid is deenergized.

5. In coin controlled vending mechanism, in combination, a coin intake slot, shutter means for closing said slot, a coin switch, stamp strip feeding mechanism for feeding a strip of stamps, a cyclically operated clutch, means for driving the driving portion of said clutch, said coin switch controlling the operation of said clutch, feeler means contacting said strip of stamps, said feeler means being operatively connected to said shutter to close said shutter when said strip of stamps is exhausted, and means operated by said clutch for moving said feeler means out of contact with said stamp strip during each cyclical operation.

6. In coin controlled vending mechanism, in combination, a coin intake slot, shutter means for closing said slot, a coin switch, stamp strip feeding mechanism including single revolution clutch mechanism for feeding a strip of stamps, said coin switch controlling the operation of said stamp feeding mechanism, feeler means contacting said strip of stamps, said feeler means being operatively connected to said shutter to close said shutter when said strip of stamps is exhausted, and linkage connecting said clutch mechanism and said feeler means, said single revolution clutch mechanism acting through said linkage to move said feeler means out of contact with said stamp strip when said stamp strip is being fed.

7. In coin controlled vending mechanism, in combination, a coin intake slot, a relay operated shutter for closing said slot, stamp strip feeding mechanism for feeding stamps from a coil of stamps, a coin switch, means for driving said feeding mechanism, said coin switch controlling the operation of said last-mentioned means, a roller, said stamp passing over said roller between said coil and said feeding mechanism, a feeler member resiliently urged toward a groove in said roller, said strip of stamps preventing the entrance of said feeler member into said groove, switch means controlling the operation of said relay and controlled by said feeler member, said feeler member moving into said groove when said stamp strip is exhausted to cause said shutter to close said intake slot, and means operated by said stamp feeding mechanism for moving said feeler means out of contact with said stamp strip when stamps are being fed.

8. In coin controlled vending mechanism, in combination, a coin intake slot, relay operated shutter means for closing said slot, a coin switch, stamp strip feeding mechanism for feeding a strip of stamps, said coin switch controlling the operation of said stamp feeding mechanism, feeler means contacting said strip of stamps, switch means, and means operatively connecting said feeler means and said switch means, said feeler means acting through said connecting means and said switch means to close said shutter means when said strip of stamps is exhausted, and means operated by said stamp feeding mechanism for moving said feeler means out of contact with said stamp strip when stamps are being fed.

9. In coin controlled vending mechanism, in combination, a coin intake slot, a relay operated shutter for closing said slot, a coin switch, stamp strip feeding mechanism for feeding stamps from a coil of stamps, means for driving said feeding mechanism, a roller, said stamp strip passing over said roller between said coil and said feeding mechanism, a feeler member resiliently urged toward a groove in said roller, said strip of stamps preventing the entrance of said feeler member into said groove, switch means controlling the operation of said relay and controlled by said feeler member, a cam driven by said driving means, means operatively connecting said feeler member and said cam, said cam acting through said last-mentioned means to move said feeler member out of contact with said strip of stamps when stamps are being fed, said feeler member being operatively connected to said shutter to close said shutter when said strip of stamps is exhausted.

10. In coin controlled vending mechanism, in combination, a coin switch, a single revolution clutch including driving and driven portions, means for feeding a strip of stamps, means operatively connecting said stamp strip feeding means and said clutch, a solenoid controlled by said coin switch, lever means actuated by said solenoid, clutch tripping means, means forming a detachable connection between said lever means and said clutch tripping means, said lever means when operated by said solenoid moving said clutch tripping means to permit the engagement of the driving and driven portions of said clutch and cam, means for breaking said connection between said lever means and said clutch tripping means after said clutch has been tripped, said clutch tripping means being actuated by said cam means to return said clutch tripping means after tripping to a position where it disengages the driving and driven portions of said clutch at the end of a single revolution regardless of the position of said solenoid or said lever.

11. In coin controlled vending mechanism, in combination, a coin switch, a single revolution clutch including driving and driven portions, stamp strip feeding mechanism for feeding a strip of stamps, means forming a driving connection between said mechanism and the driven portion of said clutch, lever means, electrically controlled means for moving said lever means to operative position, said coin switch when closed by a coin completing the circuit to said last mentioned means whereby said coin switch controls the operation of said lever means, clutch tripping means, means forming a detachable connection between said lever means and said clutch tripping means, said lever means when actuated by said switch moving said clutch tripping means to permit engagement of the driving and driven portions of said clutch, means for breaking the connection between said lever means and said clutch tripping means after said clutch has been tripped, and means for returning said clutch tripping means to a position where it disengages said clutch at the end of a single revolution regardless of the position of said lever means.

12. In coin controlled vending mechanism, in combination, a coin switch, a single revolution clutch including driving and driven portions, stamp strip feeding mechanism for feeding a strip of stamps, means forming a driving connection between said mechanism and the driven portion of said clutch, lever means, electrically controlled means for moving said lever means to operative position, said coin switch when closed by a coin completing the circuit to said last mentioned means whereby said coin switch controls the operation of said lever means, clutch tripping means, means forming a detachable connection between said lever means and said clutch tripping means, said lever means when actuated by said switch moving said clutch tripping means to permit engagement of the driving and driven portions of said clutch, means for breaking the connection between said lever means and said clutch tripping means after said clutch has been tripped, a cam, and means operatively connecting said cam to the driven portion of said clutch, said cam actuating said clutch tripping means to return said tripping means to a position where it disengages said clutch at the end of a single revolution regardless of the position of said lever means.

13. In coin controlled vending mechanism, in combination, a coin switch, clutch means, means for driving said clutch means, a coin track, said coin switch including two electrical contact members forming a part of an electrical circuit to and controlling the operation of said clutch means, said coin switch intercepting coins passing down said coin track, means for releasing coins from said coin switch, switch means in said circuit for shunting the electrical contact established by a coin positioned between said contact members, arm means operatively connected to the driven side of said clutch, means operatively connecting said arm means to said coin releasing means and said last-mentioned switch means, said arm being operated by said clutch to release coins from said contact members and to close said last-mentioned switch means prior to the release of a coin from said last-mentioned switch, stamp strip feeding mechanism for feeding a strip of stamps, means operatively connecting said clutch means and said stamp strip feeding mechanism, feeler means for determining when the end of said stamp strip is reached, means actuated by said feeler means to prevent feeding of stamps when the end of said strip is reached, and means operated by said clutch for moving said feeler means out of contact with said stamp strip during each operating cycle.

14. In coin controlled vending mechanism, in combination, a coin switch, clutch means, means for driving said clutch means, a coin track, said coin switch including two electrical contact members forming a part of an electrical circuit to and controlling the operation of said clutch means, said contact members intercepting coins passing down said coin track, one of said coin switch members being pivotally mounted, a switch mounted adjacent said pivotally mounted contact member and disposed in said circuit for shunting the electrical contact established by a coin positioned between said contact members, a pivotally mounted arm, linkage connecting said arm to the driven side of said clutch, said arm having a contact portion one section of which first engages said shunt switch and another section of which then engages said pivotally mounted switch member, whereby said arm directly operates both said pivotally mounted contact member and said shunt switch, said arm being operated by said clutch through said linkage to release coins from said contact members and to close said shunt switch prior to the release of a coin from said contact members, stamp strip feeding mechanism for feeding a strip of stamps, and means operatively connecting said clutch means and said stamp strip feeding mechanism.

CHRISTIAN M. GOTTSCHAU.

REFERENCES CITED

The following references are of record in the file of this patent:

UNITED STATES PATENTS

| Number | Name | Date |
| --- | --- | --- |
| 397,975 | De Redon | Feb. 19, 1889 |
| 428,751 | Glass | May 27, 1890 |
| 577,533 | Miranda | Feb. 23, 1897 |
| 1,784,585 | Eller | Dec. 9, 1930 |
| 1,847,988 | Semel | Mar. 1, 1932 |
| 1,850,443 | Brahy | Mar. 22, 1932 |
| 1,949,541 | Hartman | Mar. 6, 1934 |
| 2,062,298 | Eitzen | Dec. 1, 1936 |
| 2,249,236 | Tratsch | July 15, 1941 |
| 2,258,912 | Steen et al. | Oct. 14, 1941 |
| 2,264,647 | Stearns | Dec. 2, 1941 |